United States Patent
Kim et al.

(10) Patent No.: US 9,348,139 B2
(45) Date of Patent: May 24, 2016

(54) OPEN-TYPE HEAD MOUNT DISPLAY DEVICE AND DISPLAY METHOD THEREOF

(71) Applicant: BOE Technology Group Co., Ltd., Beijing (CN)

(72) Inventors: Heecheol Kim, Beijing (CN); Youngsuk Song, Beijing (CN); Seongyeol Yoo, Beijing (CN); Seungjin Choi, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 211 days.

(21) Appl. No.: 14/077,729

(22) Filed: Nov. 12, 2013

(65) Prior Publication Data
US 2014/0132485 A1 May 15, 2014

(30) Foreign Application Priority Data

Nov. 13, 2012 (CN) .......................... 2012 1 0455101

(51) Int. Cl.
*G02B 27/01* (2006.01)

(52) U.S. Cl.
CPC ............ *G02B 27/01* (2013.01); *G02B 27/0172* (2013.01); *G02B 2027/0127* (2013.01); *G02B 2027/0132* (2013.01); *G02B 2027/0185* (2013.01); *G02B 2027/0187* (2013.01)

(58) Field of Classification Search
CPC ............... G02B 2027/0127; G02B 2027/0185; G02B 27/01; G02B 2027/0187; G02B 27/0172; G02B 2027/0132
USPC ............................................................. 345/8
See application file for complete search history.

(56) References Cited

U.S. PATENT DOCUMENTS

| | | | |
|---|---|---|---|
| 6,285,505 B1 | 9/2001 | Melville et al. | |
| 7,401,920 B1 * | 7/2008 | Kranz et al. | ................... 351/210 |
| 2003/0142041 A1 * | 7/2003 | Barlow | ................. A61B 3/113 |
| | | | 345/8 |
| 2007/0030440 A1 * | 2/2007 | Spivey | ............................ 351/55 |

(Continued)

FOREIGN PATENT DOCUMENTS

| | | |
|---|---|---|
| CA | 2750287 A | 11/2002 |
| CN | 1161087 A | 10/1997 |

(Continued)

OTHER PUBLICATIONS

Office action issued by Chinese Patent Office for priority application CN 201210455101.9 mailed May 19, 2014.

*Primary Examiner* — Ariel Balaoing
(74) *Attorney, Agent, or Firm* — Frommer Lawrence & Haug LLP

(57) ABSTRACT

The present invention provides an open-type head mount display device and a display method thereof. The open-type head mount display device according to the present invention comprises a display unit for generating display images; a focusing lens unit for adjusting the object distance of a display image from a user's eye; an image acquisition unit for acquiring the image of the two eyes of the user; a focal distance analyzing unit for obtaining the focal distance of the user's eye according to the image of the two eyes of the user; and a lens adjusting unit for adjusting the position of the focusing lens unit in the light ray propagation direction of the display image according to a control command from the analyzing unit, so that the object distance of the display image is matched with the current focal distance of the user's eye.

10 Claims, 3 Drawing Sheets

(56) References Cited

U.S. PATENT DOCUMENTS

2012/0127062 A1* 5/2012 Bar-Zeev et al. .......... 345/6
2013/0207887 A1* 8/2013 Raffle .................... G02B 27/00
    345/156

FOREIGN PATENT DOCUMENTS

| JP | 2000-249902 | 9/2000 |
| JP | 2005-107460 A | 4/2005 |

* cited by examiner

OPEN-TYPE HEAD MOUNT DISPLAY DEVICE AND DISPLAY METHOD THEREOF

FIELD OF THE INVENTION

The present invention relates to the field of display technology, and particularly relates to an open-type head mount display device and a display method thereof.

BACKGROUND OF THE INVENTION

A head mount display device (HMD), also known as glass display device, video glasses, portable cinema, or the like, is a display equipment directly worn in front of eyes of a user in a manner similar to a helmet or glasses. As shown in FIG. 1, the head mount display device comprises a display unit 1 (such as a liquid crystal display) for generating a display image; preferably there are two display units 1, which respectively provide different display images for the left eye 8a and the right eye 8b of the user, to achieve 3D display; of course, it is also feasible if there is only one display unit 1 that provides a display image for one eye (the left eye 8a or the right eye 8b) or two eyes of the user. The display unit 1 is preferably located at a side portion (such as in a "glass leg") of the head mount display device, and an display image emitted by the display unit can reach a user's eye (the user's eye present in the text refers to the left eye 8a of the user and/or the right eye 8b of the user) after being reflected by a reflection unit (including a series of reflectors 21 and 22), which is mainly for saving space of the head mount display device; of course, it is also feasible to provide the display unit 1 directly in front of the user's eye without providing reflectors.

Due to volume limitation of the head mount display device, the display image can only be emitted from a place very close to the human eye, and the object distance of the display image (the distance between the display image and the human eye) is very small. To see an object clearly, the following should be satisfied: $1/u+1/v=1/f$, wherein u is an object distance; f is the focal distance of a human eye (adjustable within a certain range); and v is an image distance (the object can be seen clearly only when the image distance is equal to the distance from the crystalline lens to the retina). Therefore, when the object distance is very small, the object can be seen clearly only if the focal distance of the human eye is also very small, but this can cause eyestrain and poor viewing experience and harm eyesight. For this reason, the head mount display device should also include a focusing lens unit, which is used for changing the diverging degree of the light rays emitted by the display unit 1 (i.e. the light rays of a display image), thereby "simulating" the display image as "a virtual display image (a virtual image)" emitted from far away (i.e. changing the object distance of the display image). The focusing lens unit 3 is arranged in the propagation path of the light rays of the display image, and each focusing lens unit 3 comprises one or more focusing lenses, and in addition to adjusting the object distance of the display image, the focusing lens unit 3 also has the effects of amplifying the display image, flipping the display image and the like.

Of course, the above display unit 1, reflectors, focusing lens unit 3 and the like have various known forms, and are not described herein in details.

Head mount display devices can be divided into two categories: closed type and open type. As to the closed-type head mount display device, the area in front of the user's eye is closed, and the user can only see the display image, but cannot see an external object. As to the open-type head mount display device, the area in front of the user's eye is at, least partially light-transmissive (a reflector 22, if located here, is preferably a reflection-transmission mirror), so that the user can see both the display image and the external object (such as information on the external object).

As the focal, distance of the human eye at the same moment is fixed, the object distance of the display image of the open-type head mount display device (i.e. the distance from the "virtual display image" to the user's eye) is the same as the object distance of the external object; otherwise, when the focal distance of the user's eye is matched with the object distance of the display image, the display effect is not good, and the display image is clear, but the external object corresponding to the display image is obscure; and when the focal distance of the user's eye is matched with the object distance of the external object, the external object is clear, but the display image is obscure. As the object distance of the external object is unchangeable, it is only possible to adapt the object distance of the display image to the object distance of the external object. The adjustment of the object distance of the display image is achieved by adjusting the position of the focusing lens unit 3 in the light ray propagation direction of the display image (the unidirectional arrow direction between the display unit 1 and the reflector 21 in FIG. 1), which may be overall adjustment of the position of the focusing lens unit 3 or be adjustment of the position of part of the focusing lenses in the focusing lens unit 3. Changing the object distance of the display image by adjusting the position of the focusing lens can be achieved in various known ways, and thus is not described herein in details. Currently, the position of the focusing lens is manually adjusted, and the user adjusts the position of the focusing lens unit 3 by himself through turning a rotary knob or the like.

The inventor finds that at least the following problems exist in the prior art: when an open-type head mount display device is used, an external object seen by the user changes at all times, accordingly the object distance of the external object also changes at all times, and this requires the user to adjust the object distance of the display image from time to time, so the operation is troublesome; and manual adjustment is not likely to be performed timely, so the phenomenon of image obscurity still occurs, and the display effect is not good.

SUMMARY OF THE INVENTION

Technical problems to be solved by the present invention include providing an open-type head mount display device with simple operation and good display effect, in view of the problem that the open-type head mount display device in the prior art is troublesome to operate and poor in display effect.

The technical solution used to solve the technical problems of the present invention is an open-type head mount display device, which comprises:

a display unit for generating display images;

a focusing lens unit for adjusting object distance of a display image from a user's eye;

an image acquisition unit for acquiring an image of the two eyes of the user;

focal distance analyzing unit for calculating focal distance of the user's eye according to the image of the two eyes of the user; and a lens adjusting unit for adjusting position of the focusing lens unit in light ray propagation direction of the display image to adjust the object distance of the display image from the user's eye, and to match the object distance of the display image from the user's eye with the current focal distance of the user's eye.

In this case, the area in front of the user's eye in the "open-type head mount display device" is at least partially transparent (such as being half reflective and half transparent), so that the user can not only see the image generated by the head mount display device, but also see a real external object. The "display image" refers to an image generated by the head mount display device and provided to the user. "Adjusting the object distance of the display image from the user's eye" refers to changing the diverging degree of the light rays of the display image, thereby "simulating" the display image as a "virtual display image" emitted from far away, and "the object distance of the display image from the user's eye" refers to the distance from the "virtual display image" to the user's eye. "The focal distance of the user's eye" refers to the distance from the current focus of the user's eye to the user's eye, namely the distance between the focus position on the user's sight path and the user's eye. "Calculating the focal distance of the user's eye according to the image of the two eyes of the user" is a known technique, which calculates the focal distance of the eye by analyzing the position, the form and the like of the user's eye; for example, an existing sight control system (also known as eye control system, invisible hand or the like) acquires the image of the two eyes of the user by a video camera, analyzes the changes of the focal distance and the focus of the use's eye according to the acquired image, and controls a mouse or the like according to the focal distance and the focus; as the technique of calculating the focal distance of the user's eye according to the image of the two eyes of the user is known, it is not described herein in details.

In the open-type head mount display device according to the present invention, the image of the two eyes of the user can be acquired by the image acquisition unit, and be analyzed by the focal distance analyzing unit to obtain the focal distance of the user's eye, and then the position of the focusing lens unit in the light propagation direction of the display image is adjusted by the lens adjusting unit, so that the object distance of the display image (i.e., the object distance of the display image from the user's eye) is adjusted to match the object distance of the display image with the current focal distance of the user's eye, thereby ensuring that both the display image and the external object seen by the user are clear; as the above adjustment is automatically performed, user operation is not needed, and the device is simple to use, at the same time, change of the focal distance of the user's eye is timely responded, image is kept clear at every moment, and display effect is good.

Preferably, the open-type head mount display device further comprises a reflection unit for reflecting the display image generated by the display unit to the user's eye; and the reflection unit comprises a reflector.

Further preferably, the reflection unit also comprises a reflection-transmission mirror, which is arranged in front of the user's eye.

Further preferably, the reflection unit also comprises an image acquisition mirror, which is a reflection-transmission mirror, wherein the image acquisition unit acquires the image of the user's eye reflected by the image acquisition mirror, while the display image is transmitted to the user's eye after being transmitted through the image acquisition mirror; or the image acquisition unit acquires the image of the user's eye transmitted through the image acquisition mirror, while the display image is transmitted to the user's eye after being reflected by the image acquisition mirror.

Preferably, the image acquisition unit is arranged in front of the user's eye, or at both sides of the user's eye.

Preferably, the focal distance analyzing unit calculates the focal distance of user's eye according to distance between pupils of the two eyes of the user.

Preferably, the image acquisition unit comprises two image acquirers respectively for acquiring the images of the left eye and the right eye of the user; or one image acquirer for acquiring the image of the two eyes of the user.

Further preferably, the image acquirer is a CCD (Charge Coupled Device) camera or a CCD video camera.

Preferably, there are two said display units respectively for generating display images emitted to the left eye and the right eye of the user.

Technical problems to be solved by the present invention include providing a display method of an open-type bead mount display device with simple operation and good display effect, in view of the problems that the open-type head mount display device in the prior art is troublesome to operate and poor in display effect.

The technical solution used to solve the technical problems of the present invention is a display method of an open-type head mount display device, in the open-type head mount display device a display unit generates a display image, and object distance of the display image from a user's eye is adjusted by a focusing lens unit; and the display method of the open-type head mount display device includes:

acquiring an image of the two eyes of the user by an image acquisition unit;

calculating focal distance of user's eye by a focal distance analyzing unit according to the image of the two eyes of the user; and adjusting position of a focusing lens unit in light ray propagation direction of the display image by a lens adjusting unit according to the focal distance of the user's eye, to adjust object distance of the display image from the user's eye, and to match the object distance of the display image from the user's eye with the current focal distance of the user's eye.

The display method of an open-type, head mount display device according to the present invention is actually a display method of the above open-type head mount display device, and therefore it is simple in operation and good in display effect.

Preferably, calculating the focal distance of the user's eye by the focal distance analyzing unit according to the image of the two eyes of the user includes: calculating the focal distance of the user's eye by the focal distance analyzing unit according to the distance between pupils of the two eyes of the user.

Figure 1:
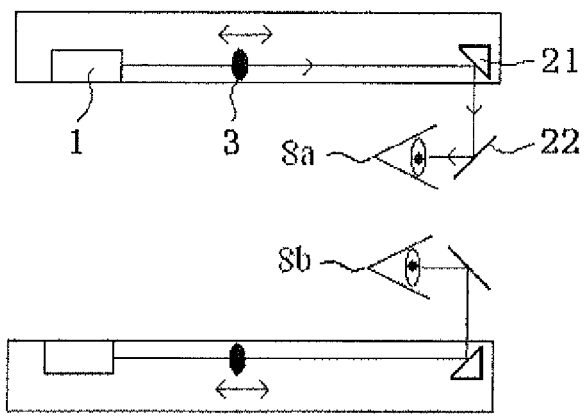
FIG. 1 is a structural schematic diagram of an existing head mount display device.

REFERENCE NUMERALS 1. display unit; 21. reflector; 22. mirror in front of user's eye; 23. image acquisition lens: 3 focusing lens unit; 4. image acquisition unit; 8a. user's left eye; 8b user's right eye.

DETAILED DESCRIPTION OF THE EMBODIMENTS

To make the person skilled in the art better understand the technical solution of the present invention, the present invention is further described below in details in conjunction with the accompanying drawings and the specific embodiments.

Embodiment 1

Figure 2:
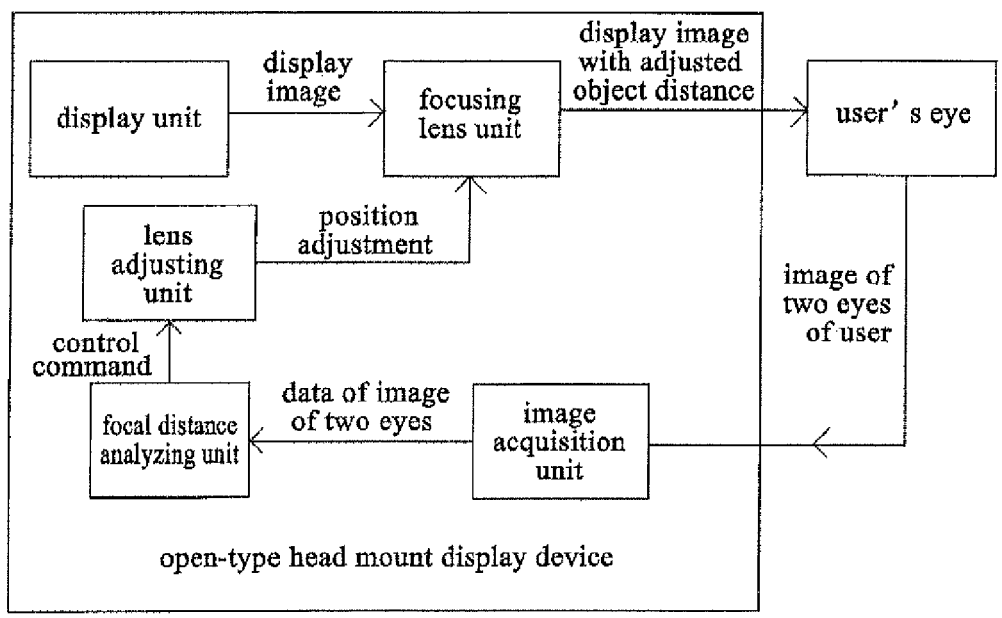
FIG. 2 is a block diagram of an open-type head mount display device of embodiment 1 of the present invention.

As shown in FIG. 2, the embodiment provides an open-type head mount display device, which comprises:
a display unit for generating display images;
a focusing lens unit for adjusting object distance of a display image from a user's eye;
an image acquisition unit for acquiring an image of the two eyes of the user;
a focal distance analyzing unit for calculating the focal distance of the user's eye according to the image of each of the two eyes of the user; and
a lens adjusting unit for adjusting position of the focusing lens unit in light ray propagation direction of the display image to adjust the object distance of the display image from the user's eye, and to match the object distance of the display image from the user's eye with the current focal distance of the user's eye.

In the embodiment, matching the object distance of the display image from the user's eye with the current focal distance of the user's eye is specifically as follows:

In the known imaging formula $1/u+1/v=1/f$, u is the object distance of the display image from the user's eye; v is the image distance, which is equal to the distance from the crystalline lens to the retina of the user (also referred to as eyeball depth), and for each user, the distance from the crystalline lens to the retina is fixed, and can be obtained from the visual acuity of the user, which belongs to common general technology and is therefore not described herein in details; and f is the focal distance of the user's eye. As the focal distance analyzing unit can calculate the focal distance f of the user's eye according to the image of the two eyes of the user, and the image distance v is a known constant, the object distance u of the display image from the user's eye matched with the current focal distance f of the user's eye can be calculated according to the focal distance f of the user's eye and the known image distance v in conjunction with the imaging formula $1/u+1/v=1/f$. The actual object distance of the display image from the user's eye is adjusted by the lens adjusting unit through adjusting the position of the focusing lens unit in the light ray propagation direction of the display image to be equal to the calculated object distance u of the display image from the user's eye, so that the object distance of the display image from the user's eye is matched with the current focal distance of the user's eye, and as the current focal distance of the user's eye is also matched with the object distance of an external object from the user's eye, the object distance of the display image from the user's eye is also equal to the object distance of the external object from the user's eye, thus ensuring that both the display image and the external object seen by the user are clear.

In the open-type head mount display device of the embodiment, the image of the two eyes of the user can be acquired by the image acquisition unit, and the image of the two eyes of the user is analyzed by the focal distance analyzing unit to obtain the focal distance of the user's eye, then the object distance of the display image (i.e. the object distance of the display image from the user's eye) is adjusted through adjusting the position of the focusing lens unit in the light ray propagation direction of the display image by the lens adjusting unit to match the object distance of the display image with the current focal distance of the user's eye, thereby ensuring that both the display image and the external object seen by the user are clear; as the above adjustment is automatically performed, user operation is not needed, and the device is simple to use, at the same time the change of the focal distance of the user's eye can be timely responded, the image is kept clear at every moment, and the display effect is good.

Embodiment 2

The embodiment provides an open-type head mount display device, as shown in FIGS. 3 to 6, which comprises a display unit 1, a focusing lens unit 3, an image acquisition unit 4, a focal distance analyzing unit and a lens adjusting unit.

The display unit 1 is used for generating a display image, and can be a conventional display device, such as a liquid crystal display (LCD) unit, an organic electroluminescent display (OLED) unit and the like. Of course, in order to adapt to the head mount display device, the display unit 1 should be very small in volume and relatively high in resolution.

Figure 3:
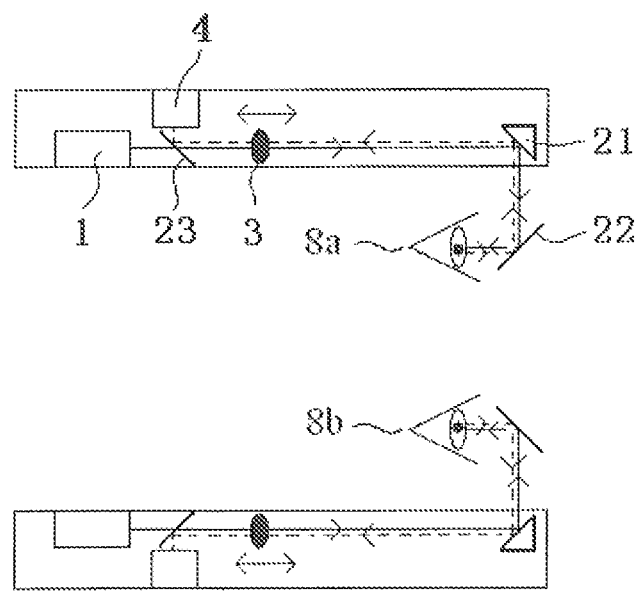
FIG. 3 is a structural schematic diagram of a first type of open-type head mount display device of embodiment 2 of the present invention.
Figure 4:
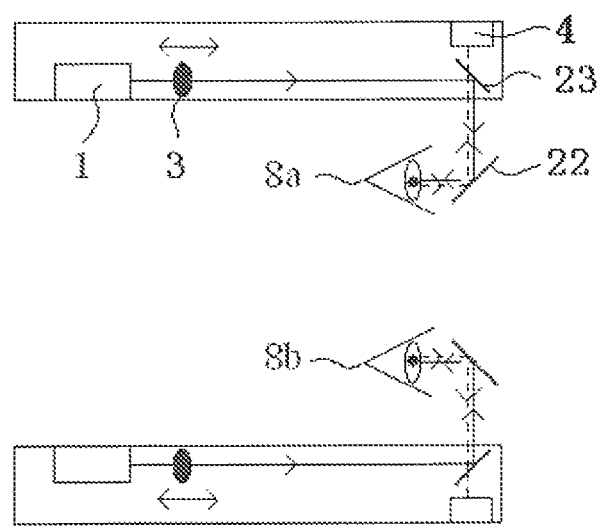
FIG. 4 is a structural schematic diagram of a second type of open-type head mount display device of embodiment 2 of the present invention.
Figure 5:
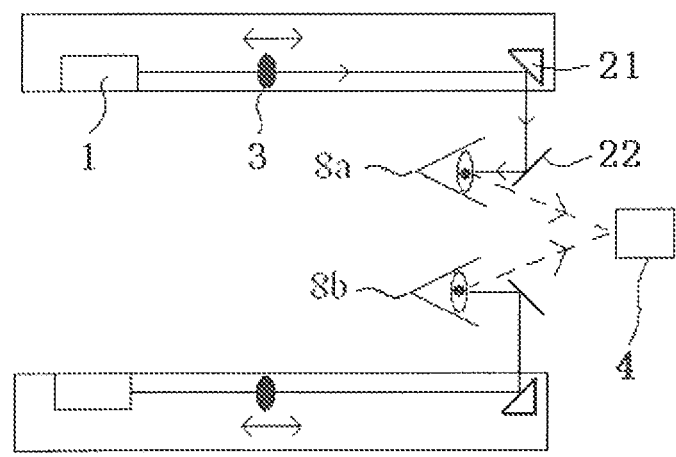
FIG. 5 is a structural schematic diagram of a third type of open-type head mount display device of embodiment 2 of the present invention.

Preferably, as shown in FIGS. 3 to 5, there are two display units 1, which respectively generate display images to be viewed by a left eye 8a and a right eye 8b of the user, to achieve 3D display effect. Of course, it is also feasible if there is only one display unit 1 that provides a display image for one eye or two eyes of the user.

Preferably, the display unit 1 is arranged at a side portion (such as in a "glass leg") of the open-type head mount display device, so the display surface of the display unit 1 does not face toward the user's eye, and the display image emitted by the display unit 1 cannot directly reach the user's eye. Therefore, in this case, the open-type head mount display device should also comprise a reflection unit, which is used for reflecting the display image generated by the display unit 1 to the user's eye. The reflection unit comprises a series of reflectors 21, 22, 23 whose specific positions, number, types and the like are determined according to the condition of the display unit 1, as long, as the reflection unit can reflect the display image to the user's eye. The reflecting unit has various known forms, and is therefore not described herein in details.

In the open-type head mount display device, the user also needs to view real external objects, and thus if the reflector 22 is provided in front of the user's eye, it is preferably a reflection-transmission mirror. The reflection-transmission mirror is a conventional optical element, which can reflect some light rays (for example, 30% of light rays are reflected), and can also allow some light rays to transmit therethrough (for example, 70% of light rays are transmitted), so that it can reflect the display image to the user's eye, and also allows the user to view the external objects therethrough at the same time. Of course, it is also feasible if the reflector 22 in front of the user's eye only has reflecting function, but in this case some external objects cannot be seen within the user's field of view due to being blocked by the reflector 22.

Of course, it is also feasible if no reflecting unit is provided, and the display 1 is arranged in front of the user's eye (i.e. similar to the position of the image acquisition unit 4 in FIG. 5), so that the display image generated by the display 1 directly enters the user's eye (in this case it should be ensured that the display unit 1 will not block the user's view of the external objects, so the display unit 1 can be arranged above or below in front of the user's eye or the like).

The focusing lens unit 3 is used for adjusting the object distance of the display image from the user's eye, that is to say, the focusing lens unit 3 can change the diverging degree of the light rays of the display image, thereby "simulating" it as a "virtual display image" emitted from far away; meanwhile, the focusing lens unit 3 can also achieve the functions of amplifying the display image, flipping the display unit and the like. Each focusing lens unit 3 can include one or more focusing lenses, and each focusing lens can be distributed at different positions in the light path from the display unit 1 to the user's eye. The focusing lens unit 3 has various known forms in respect of specific position, number, type and the like, and is therefore not described herein in details.

The image acquisition unit 4 is used for acquiring the image of the two eyes of the user, and transmitting data of the image to the focal distance analyzing unit.

Preferably, as shown in FIGS. 3 and 4, the reflection unit also comprises an image acquisition mirror 23, which is a reflection-transmission mirror. Obviously, the reflection unit can reflect the display image to the user's eye (the path of the solid line in the figures) on the one hand, and can also reflect the image of the user's eye back in the reverse path (the path of the dashed line in the figures), and thus if the image acquisition unit 4 is directly arranged in the light path of the display image to acquire the reflected image of the user's eye, the propagation of the display image will be inevitably blocked. When the image acquisition mirror 23 is provided, as shown in FIG. 3, the image acquisition unit 4 acquires the image of the user's eye reflected by the image acquisition mirror 23, and the display image is transmitted to the user's eye after being transmitted through the image acquisition mirror 23; or as shown in FIG. 4, the image acquisition unit 4 acquires the image of the user's eye transmitted through the image acquisition mirror 23, and the display image is transmitted to the user's eye after being reflected by the image acquisition mirror 23; in summary, through providing the image acquisition mirror 23, the acquisition of the image of the user's eye and the propagation of the display image do not influence each other.

Preferably, the image acquisition unit 4 can also be directly arranged in front of the user's eye and acquire the image of the user's eye directly without passing through the reflection unit (thus providing the image acquisition mirror 23 is unnecessary), as shown in FIG. 5; of course, the image acquisition unit 4 in this case should not block the user's view of the external objects, so it can be arranged above or below in front of the user's eye. Of course, according to the requirement on overall aesthetic design of the product, the image acquisition units 4 can also be arranged at both sides of the user's eye.

Preferably, the image acquisition unit 4 can comprise two image acquirers for acquiring the images of the left eye 8a and the tight eye 8b of the user, respectively, as shown in FIGS. 3 and 4; or the image acquisition unit can only have one image acquirer for acquiring the image of the two eyes of the user, as shown in FIG. 5.

Preferably, the image acquirer is a CCD (Charge Coupled Device) camera or a CCD video camera. These two kinds of image acquirers are small in volume, light in weight, low in cost and mature in technology, thus being particularly suitable for use in the open-type head mount display device.

In summary, the image acquisition unit 4 has various specific forms, can be arranged at different positions, can directly acquire the image of the user's eye or acquire the reflected or transmitted image of the user's eye, and can only include one image acquirer or have two image acquirers. The image acquirers can be different types of devices, as tong as they can achieve the function of acquiring the image of the two eyes of the user.

The focal distance analyzing unit is used for analyzing the image of the two eyes of the user to calculate the focal distance of the user's eye (i.e. determining how far the object that the user's eye is viewing is), and sending a control command to the lens adjusting unit according to the focal distance; and the focal distance analyzing unit can be any unit with data processing capability, such as a CPU, a microchip or the like.

The technique of obtaining the focal distance of the user's eye by analyzing the image of the two eyes of the user is known. For example, a sight line control system for serving the physically disabled users (also known as eye control system, invisible hand or the like) has been available in the market, and it acquires the image of the two eyes of the user by a video camera, then determines the focal distance of the user's eye and the change of the focus position by analyzing the image, and controls a mouse according to the change (such as moving the mouse to the focus position).

Figure 6:
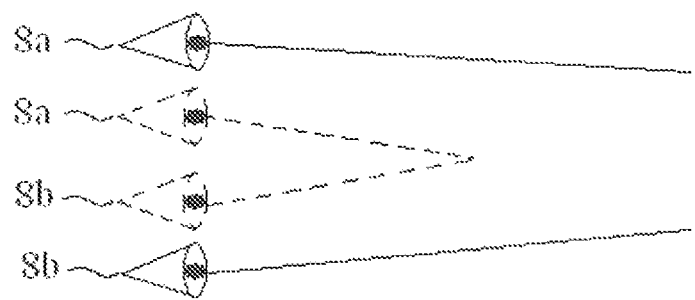
FIG. 6 is a principle schematic diagram of determining focal distance of eyes according to distance between pupils of two eyes.

Preferably, the focal distance analyzing unit can obtain the focal distance of the user's eye by analyzing the distance between the pupils of the two eyes of the user, and the basic principle is as shown in FIG. 6: when the user views an object that is relatively far away (i.e. with a relatively large distance), the distance between the pupils of the two eyes is relatively large, to ensure that the sight lines of the two eyes are nearly parallel to each other and that the focus is farther (as shown by the solid line in the figure); and when the user views an object that is relatively close (i.e. with a relatively small focal distance), the distance between the pupils of the two eyes is relatively small, to ensure that the included angle between the sight lines of the two eyes is relatively large and that the focus is closer (as shown by the dashed line in the figure).

Of course, there are other known methods for obtaining the focal distance of the user's eye by analyzing the image of the two eyes of the user, and they are not described herein in details.

A lens adjusting unit is used for adjusting the position of the focusing lens unit 3 in the light ray propagation direction of the display image according to the control command sent by the focal distance analyzing unit to adjust the object distance of the display image from the user's eye, and to match the object distance of the display image from the user's eye with the current focal distance of the user's eye. How to match the object distance of the display image from the user's eye with the current focal distance of the user's eye has already been described in details in embodiment 1, and is therefore not described herein in details.

Specifically, the lens adjusting unit can be any device capable of driving the focusing lens unit 3 to move in the light ray propagation direction of the display image according to the control command sent by the focal distance analyzing unit, such as a micro hydraulic unit, a micro motor or the like. As there are many different known methods for driving the focusing lens unit 3 to move, they are not described herein in details. Similarly, there are many different methods for changing the object distance of the display image by adjusting the position of the focusing lens unit 3, which may be moving some individual focusing lenses in the focusing lens unit separately, or moving the whole focusing lens unit 3, or the like, and as these methods are known, they are not described herein in details.

Obviously, in the open-type head mount display device of the embodiment, the image of the two eyes of the user can be acquired in real time by the image acquisition unit 4 (so when the image acquirer is a CCD camera, it should take pictures continuously to continuously acquire images of the two eyes of the user), the image of the two eyes of the user is analyzed by the focal distance analyzing unit to obtain the focal distance of the user's eye, then the position of the focusing lens unit in the light ray propagation direction of the display image is adjusted by the lens adjusting unit, and the object distance of the display image is accordingly adjusted to be matched with the current focal distance of the user's eye, thus ensuring that both the display image and the external object seen by the user are clear; as the above adjustment is automatically performed, user operation is not needed, and the device is simple to use, at the same time the change of the focal distance of the user's eye can be timely responded, the image is kept clear at every moment, and display effect is good.

Embodiment 3

The embodiment provides a display method of an open-type head mount display device. In the open-type head mount display device, a display unit generates a display image, and the object distance of the display image from a user's eye is adjusted by a focusing lens unit.

The display method of the open-type head mount display device of the embodiment includes:

acquiring the image of the two eyes of the user by an image acquisition unit;

calculating the focal distance of user's eye by a focal distance analyzing unit according to the image of the two eyes of the user; and adjusting the position of the focusing lens unit in light ray propagation direction of the display image by a lens adjusting unit according to the focal distance of the user's eye, to adjust the object distance of the display image from the user's eye, and to match the object distance of the display image from the user's eye with the current focal distance of the user's eye.

Preferably, calculating the focal distance of the user's eye by the focal distance analyzing unit according to the image of the two eyes of the user includes calculating the focal distance of the user's eye by the focal distance analyzing unit according to the distance between pupils of the two eyes of the user.

The display method of the open-type head mount display device of the embodiment is actually a display method of the open-type head mount display device in the above embodiments, and thus is simple in operation and good in display effect.

It should be understood that the above embodiments are only exemplary embodiments for illustrating the principle of the present invention, however, the present invention is not limited thereto. Various variations and improvements can be made by the person skill in the art without departing from the spirit and essence of the present invention, and these variations and improvements should also be considered to be within the protection scope of the present invention.

The invention claimed is:

1. An open-type head mount display device, comprising:
a display unit for generating display images;
a focusing lens unit for adjusting an object distance of a display image from a user's eye;
an image acquisition unit for acquiring an image of the two eyes of the user, wherein the image acquisition unit acquires the image of the user's eye reflected by an image acquisition mirror, and the display image is transmitted to the user's eye after being transmitted through the image acquisition mirror, wherein the image acquisition unit is arranged at both sides of the user's eyes;
a focal distance analyzing unit for calculating a focal distance of the user's eye according to the image of the two eyes of the user; and
a lens adjusting unit for adjusting position of the focusing lens unit in light ray propagation direction of the display image to adjust the object distance of the display image from the user's eye, and to match the object distance of the display image from the user's eye with the current focal distance of the user's eye.

2. The open-type head mount display device according to claim 1, further comprising:
a reflection unit for reflecting the display image generated by the display unit to the user's eye, the reflection unit comprising a reflector.

3. The open-type head mount display device according to claim 2, wherein the reflection unit also comprises a reflection-transmission mirror, which is arranged in front of the user's eye.

4. The open-type head mount display device according to claim 2, wherein the reflection unit also comprises the image acquisition mirror, which is a reflection-transmission mirror, wherein
the image acquisition unit acquires the image of the user's eye transmitted through the image acquisition mirror, and the display image is transmitted to the use's eye after being reflected by the image acquisition mirror.

5. The open-type head mount display device according to claim 1, wherein,
the focal distance analyzing unit calculates the focal distance of user's eye according to distance between pupils of the two eyes of the user.

6. The open-type head mount display device according to claim 1, wherein, the image acquisition unit comprises:
two image acquirers for acquiring images of the left eye and the right eye of the user, respectively, or
one image acquirer for acquiring the image of the two eyes of the user.

7. The open-type head mount display device according to claim 6, wherein,
the image acquirer is a CCD camera or a CCD video camera.

8. The open-type head mount display device according to claim 1, wherein,
there are two said display units for generating display images emitted to the left eye and the right eye of the user, respectively.

9. A display method of an open-type head mount display device in which a display unit generates a display image, and an object distance of the display image from a user's eye is adjusted by a focusing lens unit, and the display method of the open-type head mount display device including:
acquiring an image of the two eyes of the user by an image acquisition unit, wherein the image acquisition unit acquires the image of the user's eye reflected by an image acquisition mirror, and the display image is transmitted to the user's eye after being transmitted through the image acquisition mirror, wherein the image acquisition unit is arranged at both sides of the user's eyes;
calculating the focal distance of user's eye by a focal distance analyzing unit according to the image of the two eyes of the user; and
adjusting position of the focusing lens unit in light ray propagation direction of the display image by a lens adjusting unit according to the focal distance of the user's eye, to adjust the object distance of the display image from the user's eye, and to match the object distance of the display image from the user's eye with the current focal distance of the user's eye.

10. The display method of the open-type head mount display device according to claim 9, wherein calculating the focal distance of the user's eye by the focal distance analyzing unit according to the image of the two eyes of the user includes:

calculating the focal distance of the user's eye by the focal distance analyzing unit according to a distance between pupils of the two eyes of the user.

* * * * *